R. M. POST.
CASTER.
APPLICATION FILED FEB. 11, 1921.
1,383,337.
Patented July 5, 1921.
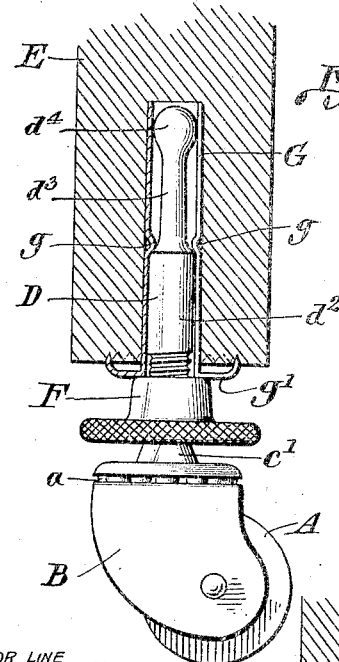
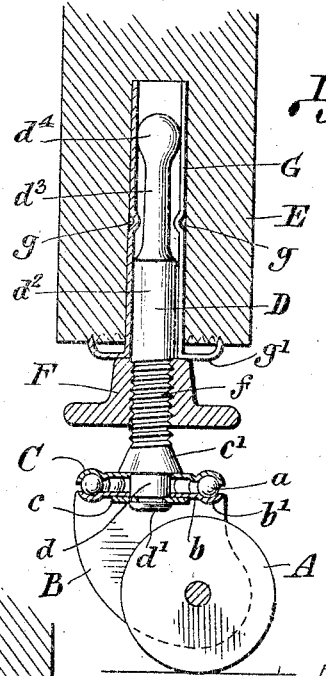
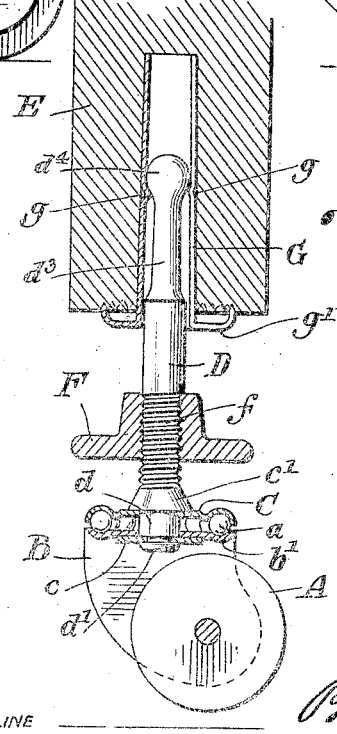
Inventor,
Robert M. Post,
by his Attorneys
Baldwin & Wight

UNITED STATES PATENT OFFICE.

ROBERT M. POST, OF CHETEK, WISCONSIN.

CASTER.

1,383,337.            Specification of Letters Patent.            Patented July 5, 1921.

Application filed February 11, 1921. Serial No. 444,184.

*To all whom it may concern:*

Be it known that I, ROBERT M. POST, a citizen of the United States, residing at Chetek, in the county of Barron and State of Wisconsin, have invented certain new and useful Improvements in Casters, of which the following is a specification.

This invention relates to casters for articles of furniture, pianos, Victrolas, and the like, which are usually supported in such manner that they may be easily moved from place to place, and the object of my invention is to provide casters which may be easily applied, will not accidentally separate from the object which they support, and which can be quickly and conveniently adjusted to accommodate inequalities in the length of the legs of the article or in the floor level.

In carrying out my invention I provide socket members adapted to enter holes formed therefor in the object to be supported and which are so constructed as to be firmly secured in place. These socket members also are formed with devices which, while permitting the spindles of the casters to enter the sockets, prevent them from accidentally separating therefrom. The caster wheels or rollers are mounted in yokes each of which carries a spindle adapted to enter a socket member of the kind above mentioned. There is a ball bearing between the yoke and the spindle permitting the yoke and the roller to freely turn about a vertical axis. The lower portion of the spindle is screw threaded and receives an adjusting nut while the middle portion of the spindle is not threaded and fits closely, but without binding, the lower part of the socket. An upper portion of the spindle is of reduced diameter while the top of the spindle is formed with a head which fits the bore of the socket.

By this construction the socket members may be easily placed in position and securely held in place. The spindles can be quickly mounted in the sockets and will remain there without danger of separation and the casters may be given the desired vertical adjustment to hold the object properly balanced or stabilized.

In the accompanying drawings:—

Figure 1 is a sectional view of the lower portion of the leg of a piece of furniture with the caster embodying my improvements applied thereto, Fig. 2 is a similar view showing a vertical adjustment.

Fig. 3 is also similar to Figs. 1 and 2 but shows how, while the caster may be moved vertically in the socket, it is prevented from separating therefrom.

I have shown my improvements applied to the leg of an article of furniture, but it may be applied to other objects which the caster is to support.

The wheel or roller A is mounted to turn about a horizontal axis in a yoke B, the top plate $b$ of which is formed with an annular groove $b'$ to receive anti-friction balls $a$. The balls are held in place by a cap plate C held on the balls by a shouldered enlargement $c'$ on the spindle D, which latter is formed with a cylindrical part $d$ extending through the plates $b$ and C. The spindle is also formed with a head $d'$ between which and the part $b$ is interposed a washer $c$. In this way a connection is made between the spindle and the yoke which permits the yoke and roller to rotate about the vertical axis of the spindle on anti-friction balls. The lower part of the spindle is threaded at $f$ and receives an adjusting nut F. This nut is of special construction. It has a rim $f'$ which is preferably knurled as shown and it has a boss $f^2$ above the knurled rim. This construction has advantages inasmuch as the knurled rim to which the hand is applied when adjusting the nut is a considerable distance below the leg of the furniture or the end of the socket piece so that the nut can be very conveniently adjusted. The middle portion $d^2$ of the spindle is preferably cylindrical and the upper portion $d^3$ is of reduced diameter and merges into a top portion or head $d^4$ of the same diameter as the lower part $d^2$. The socket member G is adapted to enter, as shown, a hole formed in the furniture leg E which it closely fits. At its lower end the socket member is formed with a flange $g'$ serrated as shown so that when driven home it will take firm hold on the leg. Intermediate its upper and lower ends the socket member is formed with an annular groove and a corresponding bead or rib $g$ which is adapted to yield to permit the spindle to be inserted, but which prevents the spindle from dropping out of its socket.

After the socket has been applied to the leg in the manner shown in the several figures of the drawings, the spindle carrying the nut, the yoke and the roller may be inserted into the socket, its head $d^4$ being forced past the rib $g$. Thereafter the spindle is prevented from separating from the socket. The nut F is made to engage the flange $g'$ of the socket member and the caster is held a longer or shorter distance from the leg corresponding with the position of the nut.

In Fig. 1 the caster is held close to the leg, the nut F being screwed down to its full extent.

In Fig. 2 the caster is held its greatest distance from the leg, the nut being raised to its limit. Intermediate adjustments may, of course, be made, and in this way by properly adjusting the different casters, the object to which the casters are applied may be properly balanced or stabilized.

Fig. 3 illustrates the fact that the caster cannot drop out of its socket, its movement being limited by the rib $g$, but the distance between the parts $d^2$ and $d^4$ is such as to allow of the desired adjustments.

It will also be observed that when the caster is put on the market, the socket member and the spindle with other parts supported thereby can be connected and are not apt to be separated. The several parts may be made of any suitable metal. Some of the parts which are shown in the accompanying drawings as being made of sheet metal may, it is obvious, be made of cast or wrought metal for different purposes.

I claim as my invention:

1. A caster, comprising a yoke, a roller pivotally mounted therein, a spindle having a threaded lower portion, a middle unthreaded portion, a headed upper end and a part between the head and the middle portion of reduced diameter, a ball bearing between the yoke and the spindle, and a nut carried by the threaded portion of the spindle.

2. The combination of a tubular socket member having a yielding rib between its upper and lower ends, and a caster comprising a roller, its frame, a spindle connected with the frame and which has a threaded lower portion, an unthreaded intermediate portion which closely fits the socket member, a headed upper end which closely fits the socket member, and an intermediate portion of reduced diameter between the head and the unthreaded intermediate portion, and a nut carried by the threaded portion of the spindle.

3. The combination of a socket member having a yielding rib between its upper and lower ends and having a flanged serrated lower end, and a caster comprising a roller, its frame, a spindle connected with the frame and which has a threaded lower portion, an unthreaded intermediate portion closely fitting the socket, a headed upper end arranged in the socket above the yielding rib and closely fitting said socket, and an unthreaded intermediate portion of less diameter than the diameter of the socket where the yielding rib is located, and a nut carried by the threaded portion of the spindle comprising a rim serving as a handle, and a boss above the rim adapted to engage the flanged portion of the socket.

In testimony whereof, I have hereunto subscribed my name.

ROBERT M. POST.